United States Patent Office 2,931,813
Patented Apr. 5, 1960

2,931,813

1-ALKENYL-3-ALKYL-5-SULFONAMIDO-6-AMINOURACIL

Max J. Kalm, Skokie, Ill., assignor to G. D. Searle & Co., Chicago, Ill., a corporation of Delaware No Drawing. Application December 27, 1957
Serial No. 705,509

6 Claims. (Cl. 260—256.5)

This invention relates to 1-alkenyl-3-alkyl-5-sulfonamido-6-aminouracils and processes for the manufacture thereof. More particularly, this invention relates to the compounds of the formula

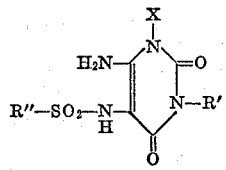

wherein R is an alkenyl radical, R' is an alkyl radical, and R" is an alkyl or aryl radical.

The alkenyl radicals comprehended by R in the foregoing formula include vinyl, allyl, butenyl, methylallyl, and like univalent groupings derived by elimination of a single hydrogen atom from acyclic hydrocarbons comprising fewer than 9 carbon atoms and containing a double bond. The alkyl radicals designated by the R' and R" in the formula are desirably lower alkyl radicals, to wit, methyl, ethyl, propyl, isopropyl, butyl, isobutyl, sec.-butyl, tert.-butyl, pentyl, isopentyl, tert.-pentyl, hexyl, isohexyl, heptyl, octyl, and in general, $C_nH_{2n+1}$ groupings wherein $n$ is a positive integer amounting to less than 9. The aryl radicals to which R" alternatively refers are such as phenyl and tolyl groupings.

The compounds of this invention are useful because of their valuable and selective pharmacological activity. They appear to inhibit the appetite without producing pressor-depressor, diuretic, or other responses which would complicate their administration to the animal organism.

Manufacture of the subject composition proceeds by heating an appropriate 5,6-diaminouracil

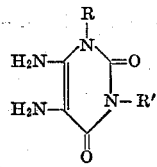

and sulfonyl chloride

R'''SO₂Cl together in the presence of a basic catalyst such as pyridine, the meanings of R, R', and R" being as previously defined. Where the starting diaminouracil is not commerically available, it can be synthesized from the corresponding compound lacking the 5-amino constituent by reaction thereof with aqueous sodium nitrite, and reduction of the resultant nitroso compound with sodium hydrosulfite in aqueous ammonia.

The following examples describe in detail certain of the uracils illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

Example 1

A. *5,6-diamino-3-methyl-1-(2-methylallyl)uracil.*—To a solution of 195 parts of 6-amino-3-ethyl-1-(2-methylallyl)uracil and 69 parts of sodium nitrite in 1375 parts of water at 85–90° C. is added, with agitation, a solution of 65 parts of glacial acetic acid in 195 parts of water. The reaction mixture is maintained in the prescribed temperature range for 30 minutes, then chilled to 20° C. The bright purple nitroso compound precipitated is removed by filtration and washed with water. To a suspension of this material in 1350 parts of water is added 205 parts of concentrated ammonium hydroxide. The resultant solution is heated to 45° C., whereupon sufficient sodium hydrosulfite is introduced—portionwise—to discharge the orange-red color, while the temperature rises to 85° C. The yellow solution is filtered, hot. From the chilled filtrate, there crystallizes pure 5,6-diamino-3-methyl-1-(2-methylallyl)uracil, the melting point of which is 148–153° C. (corrected).

B. *6-amino-5-ethylsulfonamido-3-methyl-1-(2-methylallyl)uracil.*—To a solution of 25 parts of 5,6-diamino-3-methyl-1-(2-methylallyl)uracil in 250 parts of pyridine is cautiously added 15 parts of ethanesulfonylchloride. The resultant mixture is heated, with agitation, at the boiling point of the solvent under reflux for 1½ hours, whereupon the pyridine is removed by evaporation at reduced pressures and 250 parts of water added to the residue. Crystallization occurs. Recrystallization from alcohol affords pure, white 6-amino-5-ethylsulfonamido-3-methyl-1-(2-methylallyl)uracil, the melting point of which is 157–161° C. (corrected). The product has the formula

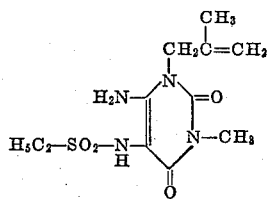

Example 2

A. *1-allyl-5,6-diamino-3-ethyluracil.*—To a solution of 213 parts of 1-allyl-6-amino-3-ethyluracil monohydrate and 69 parts of sodium nitrite in 1370 parts of water at 85–90° C. is added, with agitation, a solution of 65 parts of glacial acetic acid in 195 parts of water. The reaction mixture is maintained in the prescribed temperature range for 30 minutes, then chilled to 20° C. The bright purple nitroso compound precipitated is removed by filtration and washed with water. To a suspension of this material in 1350 parts of water is added 205 parts of concentrated ammonium hydroxide. The resultant solution is heated to 45° C., whereupon sufficient sodium hydrosulfite is introduced—portionwise—to discharge the orange-red color, while the temperature rises to 85° C. The yellow solution is filtered, hot. The filtrate is cooled and extracted with chloroform. The chloroform extract is dried over anhydrous sodium sulfate and then stripped of solvent by evaporation at reduced pressures. The crystalline residue, recrystallized from ethyl acetate, melts at 138.5–141.5° C. (corrected). This material is 1-allyl-5,6-diamino-3-ethyluracil.

B. *1-allyl-6-amino-3-ethyl-5-heptylsulfonamidouracil.*—Using the technique of Example 1B, 25 parts of 1-allyl- 5,6-diamino-3-ethyluracil and 24 parts of heptanesulfonyl chloride are caused to react in 250 parts of pyridine. Work up as in the example cited affords 1-allyl-6-amino-3-ethyl-5-heptylsulfonamidouracil, of the formula

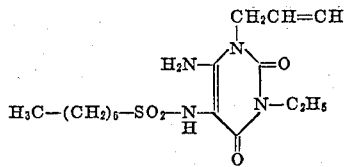

Example 3

*6-amino-3-methyl-1-(2-methylallyl)-5-phenylsulfonamidouracil.*—Interaction between 25 parts of 5,6-diamino-3-methyl-1-(2-methylallyl)uracil and 21 parts of benzenesulfonyl chloride in 250 parts of pyridine according to the technique of Example 1B affords 6-amino-3-methyl-1-(2-methylallyl)-5-phenylsulfonamidouracil. After two recrystallizations from anhydrous alcohol, the product melts at approximately 196–197.5° C. (corrected). It has the formula

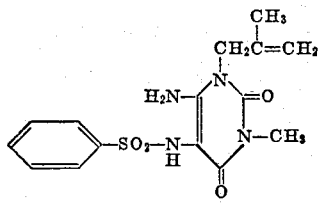

Example 4

*1-allyl-6-amino-3-ethyl - 5 - phenylsulfonamidouracil.*— Using the technique of Example 1B, 25 parts of 1-allyl-5,6-diamino-3-ethyluracil, 21 parts of benzenesulfonyl chloride, and 250 parts of pyridine are reacted together to produce 1-allyl-6-amino-3-ethyl-5-phenylsulfonamidouracil. The product, purified by crystallization from anhydrous alcohol, melts in the range 188.5–195° C. (corrected). It appears that it is a characteristic of this material not to melt sharply, since recrystallization fails to change the melting point; and elemental and infrared analyses confirm the purity of the product melting as above. 1-allyl-6-amino-3-ethyl-5-phenylsulfonamidouracil has the formula

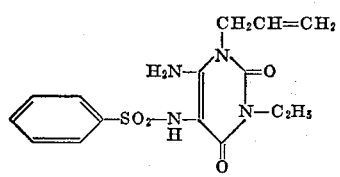

Example 5

*6-amino-3-methyl-1-(2-methylallyl)-5-p-tolylsulfonamidouracil.*—Approximately 25 parts of 5,6-diamino-3-ethyl-1-(2-methylallyl)uracil and 23 parts of p-toluene sulfonyl chloride are heated together in 250 parts of pyridine according to the procedures set forth in Example 1B. Work up as there described affords, after two crystallizations from anhydrous alcohol, pure, white 6-amino-3-methyl-1-(2-methylallyl)-5-p-tolylsulfonamidouracil, the melting point of which is 199–200° C. (corrected). This material has the formula

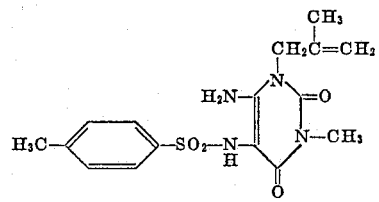

Example 6

*1-allyl-6-amino-3-ethyl - 5 - p-tolylsulfonamidouracil.*— Using the technique of Example 1B, 25 parts of 1-allyl-5,6-diamino-3-ethyluracil and 23 parts of p-toluenesulfonyl chloride are reacted together in 250 parts of pyridine to produce 1-allyl-6-amino-3-ethyl-5-p-tolylsulfonamidouracil, which, recrystallized from anhydrous alcohol, melts at 200.5–202.5° C. (corrected). The product has the formula

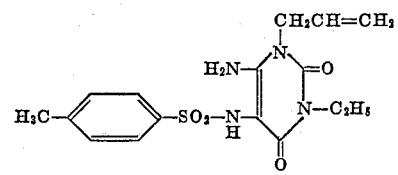

What is claimed is:

1. A compound of the formula

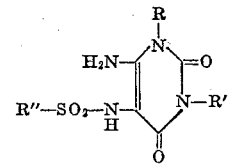

wherein R is selected from the group consisting of allyl and methylallyl radicals; R' is a lower alkyl radical; and R" is selected from the group consisting of lower alkyl, phenyl, and tolyl radicals.

2. 6-amino-5-ethylsulfonamido-3-methyl-1 - (2-methylallyl)uracil.
3. 6-amino-3-methyl-1-(2-methylallyl)-5-phenylsulfonamidouracil.
4. 1-allyl-6-amino-3-ethyl-5-phenylsulfonamidouracil.
5. 6-amino-3-methyl-1-(2-methylallyl)-5- p-tolylsulfonamidouracil.
6. 1-allyl-6-amino-3-ethyl-5-p-tolylsulfonamidouracil.

References Cited in the file of this patent

Bredereck et al.: Chemische Berichte, vol. 86, pp. 850–856 (1953).

UNITED STATES PATENT OFFICE

CERTIFICATE OF CORRECTION

Patent No. 2,931,813 April 5, 1960

Max J. Kalm

It is hereby certified that error appears in the printed specification of the above numbered patent requiring correction and that the said Letters Patent should read as corrected below.

Column 1, lines 19 to 25, the formula should appear as shown below instead of as in the patent:

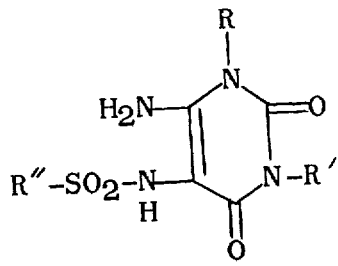

line 58, the formula should appear as shown below instead of as in the patent:

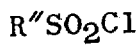

Signed and sealed this 13th day of September 1960.

(SEAL)
Attest:

KARL H. AXLINE
Attesting Officer

ROBERT C. WATSON
Commissioner of Patents